April 7, 1936. J. F. THOLL 2,036,974
DISCHARGER FOR CENTRIFUGAL SEPARATORS
Filed March 23, 1933 2 Sheets-Sheet 2
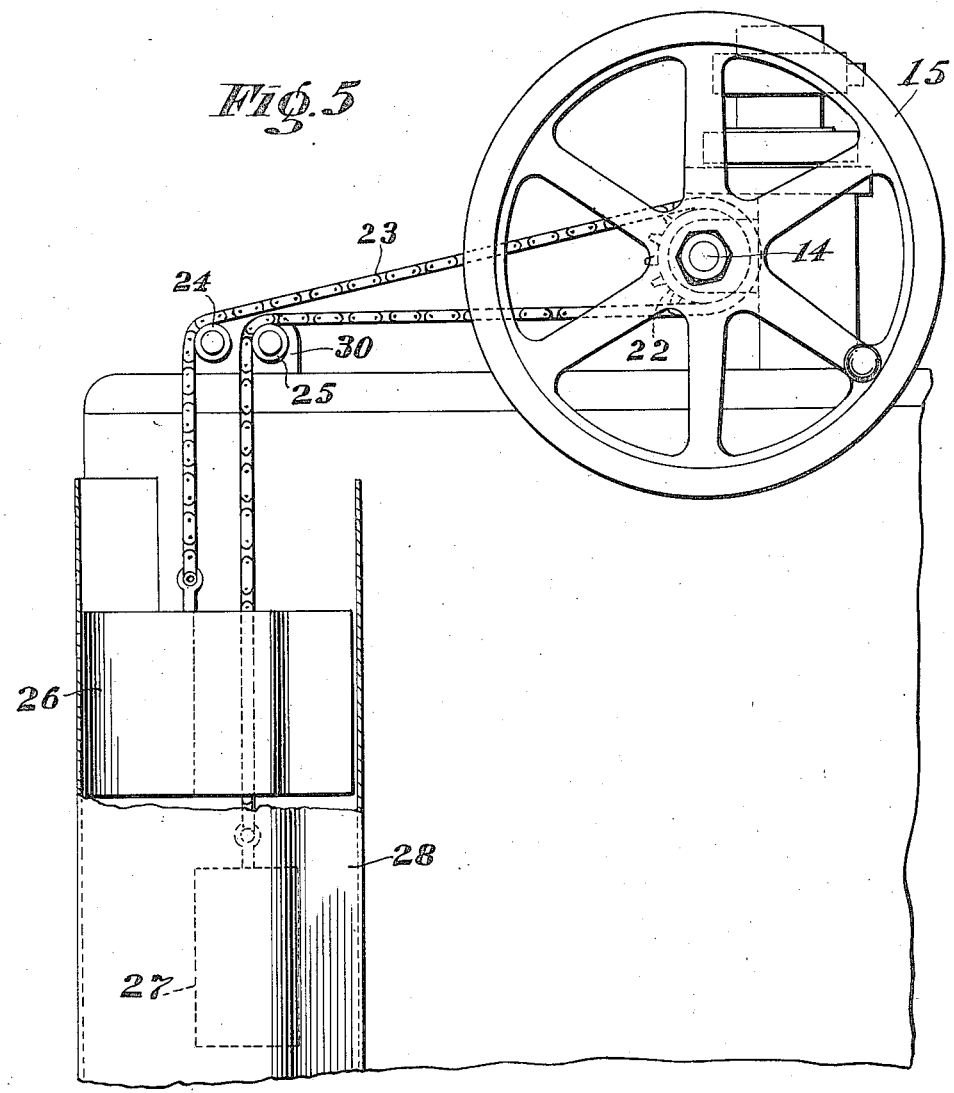

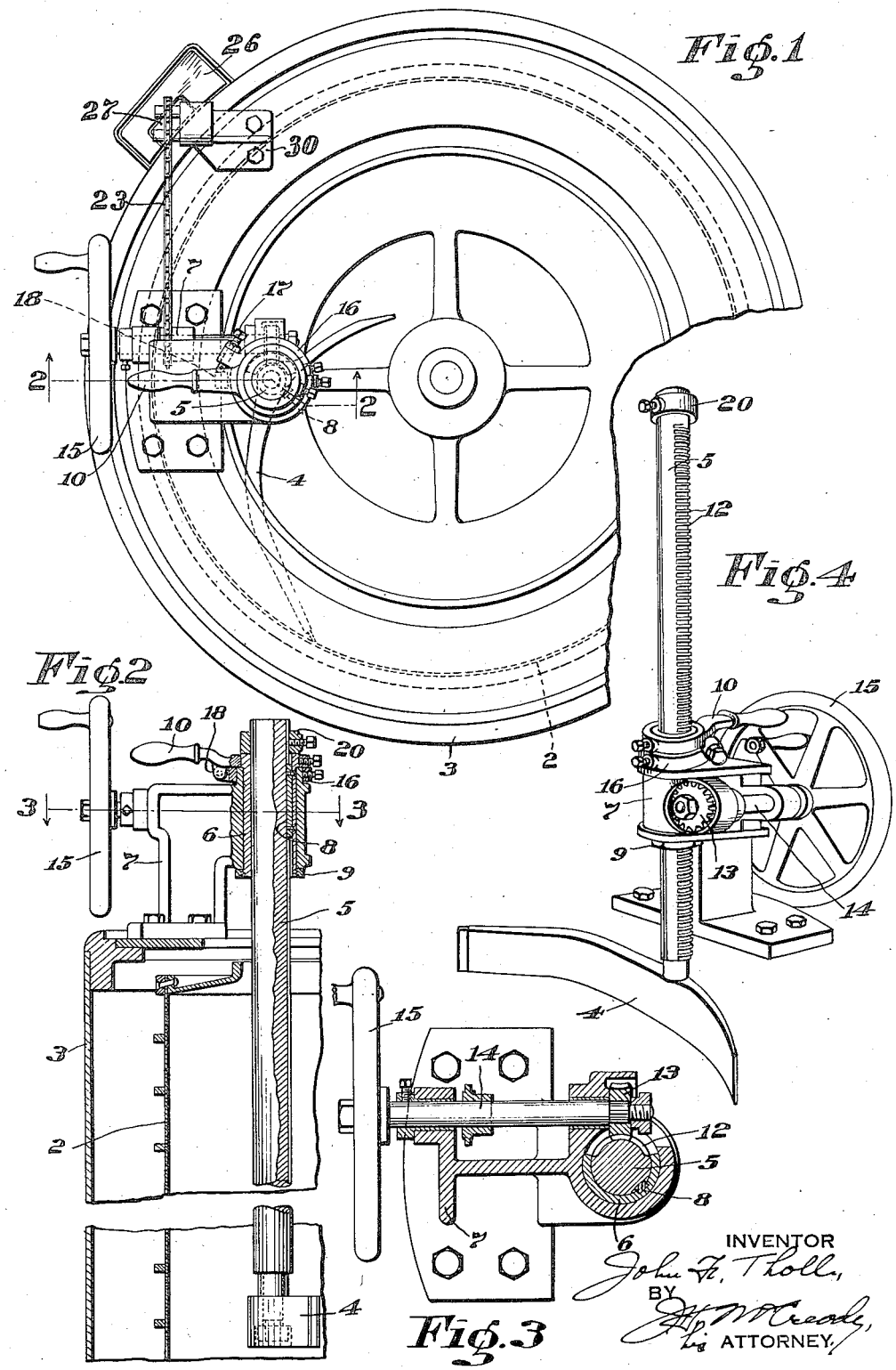

Patented Apr. 7, 1936

2,036,974

UNITED STATES PATENT OFFICE 2,036,974

DISCHARGER FOR CENTRIFUGAL SEPARATORS

John F. Tholl, Needham, Mass., assignor to American Tool and Machine Company, Hyde Park, Mass., a corporation of Massachusetts Application March 23, 1933, Serial No. 662,306

4 Claims. (Cl. 210—70)

This invention relates to centrifugal separators and is more especially concerned with the unloading or discharging mechanism for machines of this type.

As is well understood by those familiar with machines of this character, it is a common practice to equip a centrifugal separator with a scraper or scoop so mounted that it can be moved into the basket and forced into the accumulation of material which collects on the inner wall of the basket during the separating operation. The basket is rotated slowly while the edge of the scraper is so forced into the material, with the result that it plows out and dislodges the accumulated solids.

The operation of such a scraper requires two movements, one a movement of the edge of the scraper toward and from the wall of the basket, and the other a traversing movement parallel to said wall. Usually both of these movements are produced manually. In the arrangements commonly used heretofore the workman attempts to hold the scraper in the desired radial position with one hand while he raises and lowers it with the other. Usually the radial movement of the scraper is controlled by a handle mounted on the end of a shaft or post to the lower end of which the scraper is secured, and the range of vertical movement of the scraper is such that even if this movement starts with the handle in a convenient position for the operator to control, it compels him to reach above his head in order to maintain his grip on the handle as the scraper approaches the upper limit of its travel. Consequently, it is difficult for him to maintain the desired control of the scraper throughout its entire range of movement.

The present invention deals especially with these considerations. It aims to improve the unloading or discharging mechanisms for centrifugal separators with a view to facilitating this operation, providing for the more accurate control of it at all stages thereof, and making this operation much easier for the workman to perform, while at the same time providing a discharging mechanism which will be of a very sturdy and reliable nature and which can be manufactured economically.

The nature of the invention will be readily understood from the following description when read in connection with the accompanying drawings, and the novel features will be particularly pointed out in the appended claims.

In the drawings,

Figure 1 is a plan view of a portion of a centrifugal separator equipped with a discharging mechanism embodying this invention;

Fig. 2 is a vertical, sectional view approximately on the line 2—2, Fig. 1;

Fig. 3 is a horizontal, sectional view approximately on the line 3—3, Fig. 2;

Fig. 4 is a perspective view of the discharger shown in the other figures;

Fig. 5 is a side view, partly in section, illustrating the counter balancing mechanism.

The machine shown in the drawings comprises a basket 2 mounted to revolve about an upright axis and partly enclosed in a casing 3. These parts may be of any suitable construction.

The unloading or discharging mechanism provided by this invention comprises a scraper 4 secured on the lower end of an upright post or shaft 5. This shaft is arranged to slide vertically through a sleeve 6 which is supported in a bracket 7 that is bolted to the top of the machine curb or casing. A nut 9 threaded on the lower end of the sleeve effectually resists any upward thrust on the sleeve. This sleeve may be rotated in the bracket and it is splined to the shaft 5 so that the shaft and the scraper are compelled to rotate with the sleeve, notwithstanding the fact that the shaft slides freely through the sleeve. For this purpose the shaft is grooved longitudinally, as shown in the drawings, and a key or spline 8 secured to the sleeve runs in said groove. At its upper end the sleeve 6 is enlarged to overlie the adjacent portions of the bracket 7, and a handle 10 is secured rigidly to this upper portion of the sleeve. Consequently, by moving the handle 10 the scraper may be swung into any desired position within its range of movement.

For the purpose of raising and lowering the scraper a series of rack teeth 12 are cut in one side of the shaft 5, such teeth extending only part way round the circumference of the shaft, and a pinion 13 is arranged to mesh with these teeth and to drive the rack, the pinion being secured on the end of a horizontal shaft 14 to the opposite end of which the hand wheel 15 is fastened. Suitable bearing bushings in the bracket 7 operatively support the shaft 14. As shown in Fig. 3, the teeth of the pinion 13 are cut on a radius having its center in the axis of the sleeve 8 and shaft 5 so that the operative engagement of the pinion with the teeth of the rack is not disturbed by the swinging movement of the shaft around its axis. Also, as indicated in said figure, the sleeve is recessed or cut away to admit the pinion 13, the pinion acting on the rack in a region opposite to that in which the shaft is backed up or bears against the sleeve so that the shaft is effectually supported against any thrust exerted on it by the pinion.

In using this discharger the workman stands beside the machine and, by operating the handle 10, holds the scraper at the desired radial distance from the wall of the basket while with the other hand he operates the hand wheel 15 to give the scraper its vertical traversing movement. Due to the fact that the handle 10 always remains in a fixed elevation, notwithstanding the upward and downward movements of the scraper, the control of the scraper is greatly facilitated and the effort required on the part of the workman to perform the entire discharging operation is materially reduced. At the completion of this operation the scraper is moved upwardly out of the basket and is locked in its raised position in any convenient manner.

During the unloading or discharging operation it is important to prevent the movement of the scraper into actual contact with the wall of the basket and for this purpose a ring 16 is secured rigidly on the tubular extension of the bracket 7 which surrounds the upper part of the sleeve, and this ring carries a stop screw 17, Fig. 1, arranged to engage a lug 18 projecting downwardly from the lower side of the handle 10. A collar 20 adjustably secured on the upper end of the shaft 5 limits the downward movement of said shaft.

A novel arrangement also is provided for holding the discharger in its elevated and inoperative position when it is not in use, and this arrangement is illustrated in Figs. 1 and 5. It includes a sprocket wheel 22 secured fast on the shaft 14 and arranged to drive a chain 23 which runs from the sprocket wheel over guide rolls 24 and 25 to weights 26 and 27, respectively, secured to the opposite ends of the chain. One of these weights, namely, that indicated at 26, is of much greater mass than the other. The arrangement is such that when the shaft 14 is revolved to raise the scraper 4 out of the basket, the larger weight 26 will be lowered and the smaller weight 27 will be raised, a reverse movement of these weights occurring when the scraper is lowered into the basket. The larger weight has sufficient mass to substantially counterbalance the weights of the scraper, its support, and the smaller weight 27. Consequently, this arrangement serves to hold the scraper in any position to which it may be moved. At the same time it avoids the necessity for using a drum or any bulky accumulation of chain. The only function of the weight 27 is to keep the chain tight. Preferably a sheet metal guide 28 within which the weight 26 runs is secured to the casing 3, and the smaller weight runs through the larger one. A bracket 30 supports both guide rolls 24 and 25.

While I have herein shown and described a preferred embodiment of my invention, it will be understood that minor changes in details of construction may be made without departing from the spirit or scope of the invention.

Having thus described my invention, what I desire to claim as new is:

1. In a centrifugal separator, the combination with a basket mounted for rotation around an upright axis, of a scraper for acting on the material in said basket, a support for said scraper arranged to be raised and lowered, mechanism for raising and lowering said scraper and its support comprising a rotary shaft, and means for approximately counter balancing the weight of said scraper and its support; said counter balancing means including a sprocket wheel on said shaft, a chain driven by said wheel, and two weights secured on the opposite ends, respectively, of said chain to be alternately raised and lowered by it, one of said weights being of much greater mass than the other.

2. In a centrifugal separator, the combination with a basket mounted for rotation around an upright axis, of a scraper for acting on the material in said basket, a support for said scraper arranged to be raised and lowered, mechanism for raising and lowering said scraper and its support comprising a rotary shaft, and counter balancing means for said scraper and its support comprising a sprocket wheel on said shaft, a chain driven by said wheel, and a weight carried by said chain.

3. In a centrifugal separator, the combination with a basket mounted for rotation around an upright axis, of a scraper for acting on the material in said basket, an upright shaft on the lower end of which said scraper is supported, a sleeve through which said shaft is slidable vertically and to which it is splined, a stationary bracket supporting said sleeve for rotative movement about its own axis, said shaft having rack teeth in the side thereof, a pinion meshing with said teeth, a horizontal shaft mounted in said bracket and carrying said pinion, means operable to rotate said shaft and pinion to raise and lower said upright shaft and its scraper, said sleeve having a cut-away portion in the side thereof in which said pinion operates on said rack teeth, and means connected with said sleeve for swinging it and said upright shaft about the axis of said sleeve.

4. In a centrifugal separator, the combination with a basket mounted for rotation around an upright axis, of a scraper for acting on the material in said basket, an upright shaft on the lower end of which said scraper is supported, a sleeve through which said shaft is slidable vertically and to which it is splined, a stationary bracket supporting said sleeve for rotative movement about its own axis, said shaft having rack teeth cut therein and extending for a uniform depth around a substantial portion of the circumference thereof, a pinion engaging said teeth, the teeth of said pinion being curved on a radius having its center in the axis of said shaft, a horizontal shaft mounted in said bracket and carrying said pinion, means operable to rotate said shaft and pinion to raise and lower said shaft and the scraper mounted thereon, said sleeve having a cut-away portion in the side thereof in which said pinion operates on said rack teeth and a handle connected with said sleeve for swinging said sleeve, shaft and scraper about the axis of said sleeve.

JOHN F. THOLL.